United States Patent [19]

Northcutt

[11] Patent Number: 5,575,520
[45] Date of Patent: Nov. 19, 1996

[54] CLEANING DEVICE FOR STABLES

[76] Inventor: Wayne E. Northcutt, P.O. Box 1002, Crockett, Tex. 75835

[21] Appl. No.: 427,069

[22] Filed: Apr. 24, 1995

Related U.S. Application Data

[63] Continuation-in-part of Ser. No. 390,130, Feb. 17, 1995, abandoned.

[51] Int. Cl.$^6$ .................................................. E01H 1/12
[52] U.S. Cl. .............................. 294/55; 141/108; 294/1.1
[58] Field of Search ............................. 294/1.1, 1.3, 1.4, 294/9, 49, 51, 55, 56; 15/104.8, 257.1–257.4, 257.6, 257.7; 56/400.01, 400.04, 400.11; 126/243, 244; 141/108, 109, 390, 391; 209/417–419

[56] References Cited

U.S. PATENT DOCUMENTS

| | | | |
|---|---|---|---|
| 342,961 | 6/1886 | Hicks | 294/56 |
| 427,055 | 5/1890 | Cushing | 209/419 |
| 571,513 | 11/1896 | Davidson | 294/55 X |
| 678,934 | 7/1901 | Branson | 209/418 |
| 689,156 | 12/1901 | Benham | 15/257.3 |
| 4,149,745 | 4/1979 | Willis | 294/1.4 |
| 4,268,081 | 5/1981 | Hawkinson | 294/55 |
| 4,368,907 | 1/1983 | Ross | 294/1.4 |
| 5,107,666 | 4/1992 | Rahtican | 294/55 X |
| 5,417,044 | 5/1995 | Russo | 294/55 X |

FOREIGN PATENT DOCUMENTS

| | | | |
|---|---|---|---|
| 54878 | 6/1938 | Denmark | 15/257.6 |
| 982818 | 6/1951 | France | 15/257.6 |
| 2522262 | 9/1983 | France | 274/9 |
| 658177 | 3/1938 | Germany | 294/55 |
| 527972 | 11/1957 | Italy | 15/257.7 |

*Primary Examiner*—Johnny D. Cherry
*Attorney, Agent, or Firm*—Harrison & Egbert

[57] ABSTRACT

A cleaning device including a rake member, a body connected to the rake member and having an opening adjacent the rake member and an interior volume, and a gate affixed within the body so as to allow material to pass from the rake member into the interior volume while preventing movement of the material from the interior volume toward the rake member. The body includes a door affixed to an end of the body opposite the rake member so as to allow access to the interior volume. A first handle is affixed to a surface of the body and a second handle is affixed to the surface of the body between the first handle and the rake member. The body includes a throat section and a storage section connected to the throat section. The throat section and the storage sections share the interior volume. The gate includes a first gate which is affixed within the throat section of the body adjacent the rake member and a second gate affixed within the storage throat section adjacent the throat section.

16 Claims, 2 Drawing Sheets

CLEANING DEVICE FOR STABLES

RELATED APPLICATIONS

The present application is a continuation-in-part of U.S. patent application Ser. No. 08/390,130, filed on Feb. 17, 1995, and entitled "CLEANING DEVICE FOR STABLES", now abandoned.

TECHNICAL FIELD

The present invention relates to sweeping and cleaning devices, generally. More particularly, the present invention relates to devices for cleaning animal wastes from stables and pens. Furthermore, the present invention relates to devices for collecting materials that have been picked up during the cleaning operation.

BACKGROUND ART

The cleaning of stables and pens is a difficult problem. Typically, over the course of a period of time, animal wastes and animal food products will accumulate within the stable or pen area. Often, such food and/or waste will become mixed with hay within the stable. It is often necessary to use rakes and pitchforks so as to properly separate the waste material from that of the hay.

Typically, the cleaning of such wastes will require a person to lift the waste material and carry the waste material to a trash or waste container. The lifting and movement of such material is very time consuming and tiresome. Often times, the storage and waste container is positioned a relatively far distance from that of the stable or pen. In other situations, it is necessary to continually sweep or accumulate such waste into a central area. As a result, the cleaning of stables and pens can take a great deal of time and effort.

Heretofore, there have been no devices that allow for the accumulation of such waste material during the cleaning activity. It would be desirable to collect such waste materials and then transport such accumulated wastes to a disposal container.

U.S. patent application Ser. No. 08/390,130 describes a cleaning device for stables which has generally tubular body sections. After experimentation, it was found that the interior flaps had difficulty moving on the interior of such tubular body portions. Circular-shaped flaps cannot fully pivot within a circular cross-section. As such, the present invention was developed to overcome this difficulty.

It is an object of the present invention to provide a device that effectively allows for the cleaning of stables and pens.

It is another object of the present invention to provide a device that effectively accumulates the wastes during the cleaning activity.

It is another object of the present invention to provide a cleaning device that is easy to use.

It is still another object of the present invention to provide a cleaning device that is relatively inexpensive and easily manufactured.

These and other objects and advantages of the present invention will become apparent from a reading of the attached specification and appended claims.

SUMMARY OF THE INVENTION

The present invention is a cleaning device that comprises a rake member, a body connected to the rake member and a gate means affixed within the body. The body has an opening which is adjacent to the rake member. This opening communicates with an interior volume of the body. The gate means allows material to pass from the rake member into the interior volume while preventing movement of the material from the interior volume toward the rake member.

The body includes a door which is affixed to an end of the body opposite the rake member. This door allows for accessing the interior volume. The door is a panel which is hingedly connected to the end of the body opposite the rake member. This panel is movable between a first position which closes the interior volume and a second position which opens the interior volume.

The cleaning device of the present invention further includes a first handle which is affixed to a top surface of the body and a second handle which is affixed to the top surface of the body between the first handle and the rake member. One of the first and second handles is aligned with a longitudinal axis of the body. The other of the first and second handles is transverse to the longitudinal axis of the body.

The body includes a funnel which is attached to an end of the body adjacent to the rake member. This funnel serves to guide material from the rake member into the opening. The body includes a throat section, and a storage section connected to the throat section. The throat section and the storage section share the interior volume. The body has a shoulder which is formed at the juncture between the throat section and the storage section. The shoulder extends downwardly from the throat section toward the storage section. The gate is positioned within the throat section.

The gate means of the present invention includes a first gate which is affixed within the throat section of the body adjacent to the rake member, and a second gate which is affixed within the storage section adjacent the throat section. Each of these gates includes a gate member which is hingedly connected within the body and has a size slightly less than a cross-sectional area of the interior volume. The gate means further includes a stop member which is formed within the body adjacent to the gate member so as to limit a movement of the gate member. The gate member is pivotally connected to the body. The gate member is pivotable in and only in a direction away from the rake member.

DETAILED DESCRIPTION OF THE INVENTION

Figure 1:
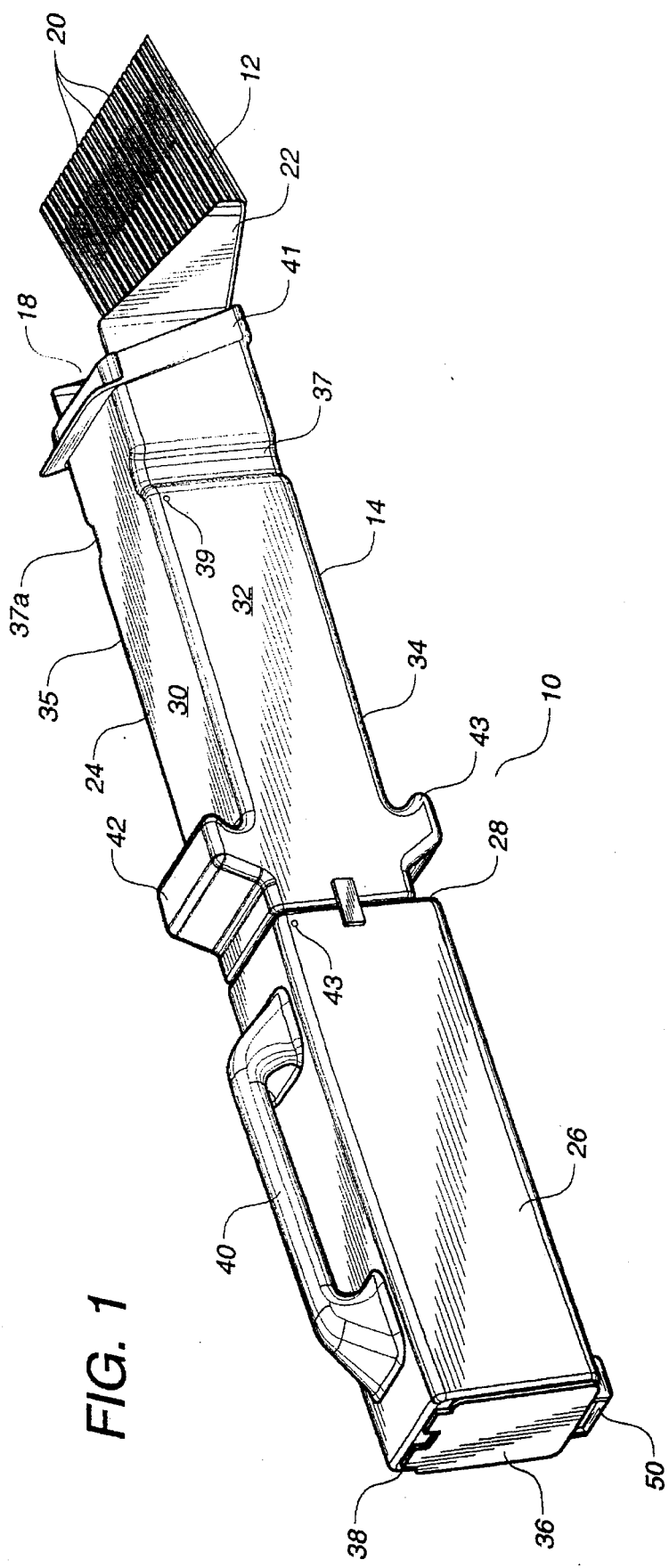
FIG. 1 is a rear perspective view of the cleaning device of the present invention.

Referring to FIG. 1, there is shown at 10 the cleaning device in accordance with the present invention. The cleaning device includes a rake member 12, a body 14, and an interior gate (shown in FIGS. 2 and 3). The body 14 is connected to the rake member 12. The body 14 has an opening 18 adjacent to the rake member 12. The body 14 includes an interior volume. The gate is affixed within the body 14 generally adjacent to the opening 18 at the rake member 12. The gate serves to allow material to pass from the rake member 12 into the interior volume of the body 14 while preventing movement of the material from the interior volume of the body 14 toward and onto the rake member 12.

The rake member 12 of the cleaning device 10 is of a conventional rake and/or pitchfork design. Typically, the rake member 12 will have a plurality of prongs 20 that extend outwardly. The rake member 12, in its preferred embodiment, is fixedly connected to the opening 18 of the body 14. However, the rake member 12 can also be detachably connected to the opening 18. If the rake member 12 is detachably connected to the opening 18 of body 14, then other devices could be substituted for the rake member 12. In particular, a shovel, if necessary, could be attached to the opening 18. As such, the use of the term "rake member" is not intended to be limitative of the type of item which is shown in FIG. 1, but is inclusive of pitchfork-type designs and/or shovels.

A funnel member 22 is formed at the end of the body 14 adjacent to the opening 18. The funnel member 22 extends outwardly from the end of the body 14 over the rake member 12. The funnel member 22 serves to guide material from the rake member 12 into the opening 18 of the body 14.

As can be seen in FIG. 1, the body 14 includes a throat section 24 and a storage section 26. The throat section 24 and the storage section 26 share the interior volume. A shoulder 28 is formed at the juncture of the throat section 24 and the storage section 26. The shoulder 28 extends downwardly from the end of the throat section 24.

The body 14 has a generally rectangular cross-sectional area. It can be seen that the throat section 24 includes a top surface 30, a first side 32, a bottom surface 34 (not shown), and an opposite side surface 35 (not shown). The configuration of the end of these surfaces 30, 32, 34, and 35 serves to define the area of the opening 18. The area of the opening 18 should be suitable so as to allow for the easy passage of material from the rake member 12 into the interior volume of the body 14. The sides 30, 32, 34, and 35 of the body 14 can be integrally formed of any suitable material, but preferably polymeric plastic.

It should be noted that an indentation 37 is formed in side 32. The indentation 37 extends into the interior volume of the body. This indentation 37 will serve as a stop to the movement of the gate and also serves to further funnel material through the throat section 24. A similar indentation 37a is formed on the opposite side 35 of the throat section 24.

In FIG. 1, a pin/hinge member 39 is shown on side 32 of throat section 32 adjacent indentation 37. This pin/hinge member 39 supports the gate on the interior of the throat section 24. A similar pin/hinge member is at a corresponding position on opposite side 35. A brace 41 extends around the end of throat section 24 adjacent opening 18 so as to give added strength and structural integrity to the end of the body 14.

A second pin/hinge member 43 is shown on a side of the storage section 26 adjacent the throat section 24. This second pin/hinge member 43 supports a gate on an interior of the storage section 26. The gate is pivotable about the pin/hinge member 43 on the interior of the storage section 26, to be described in greater detail in connection with FIGS. 2 and 3. The shoulder 28 will serve as a stop to the pivotal movement of the gate. The pin/hinge member 43 will extend transversely across the body 14.

A door 36 is affixed to an end of the body 14 opposite the rake member 12. The door 36 serves to allow access to the interior volume of the body 14. Specifically, the door 36 is a panel which is hingedly connected at 38 to the body 14. In normal use, the door 36 will be movable between a first position (shown in FIG. 1) which closes the interior volume and a second position (shown in FIG. 2) which opens to the interior volume. In essence, the door 36 serves to allow for the removal of accumulated materials from the interior volume of the body 14.

In FIG. 1, it can be seen that the top surface 30 of the body 14 includes a first handle 40 and a second handle 42. The first handle 40 is aligned with the longitudinal axis of the body 14. The second handle 42 is positioned between the first handle 40 and the rake member 12. The second handle 42 is transverse to the longitudinal axis of the body 14. In the arrangement of handles shown in FIG. 1, the configuration of the second handle 42 allows for easy pivoting and rotational movement of the device by the manipulation (by lifting and lowering) of the first handle 40. The alignment of the handles 40 and 42 comfortably fits the grip of the hands of the user. By rotating the device 10 with respect to the arrangement of the handles 40 and 42, one can cause material to move from the rake member 12, through the opening 18, and into the interior volume of the body 14. After this movement is finished, a rotation of the handle 40 so as to lower the opening 18 will cause the body 14 and the rake member 12 to be in a proper position for continued cleaning activities. The door 36 will remain closed during such activities.

It can be seen that the handle 42 extends upwardly from the top surface 30 of the throat section 24. Another handle 43 is formed symmetrically on the bottom surface 34 of the throat section 24. This handle 43 can further facilitate the manipulation of the body 12 under certain circumstances.

The door 36 can also include a latch mechanism 50 that allows the door 36 to be locked in its closed position. When it is necessary to remove the materials from the interior volume of the body 14, then the latch 50 can become unlatched such that the door 36 can rotate about its hinges 38 so as to expose the interior volume 46. The interior volume is located within the area of the storage section 26.

In normal use, the arrangement of the shoulder 28 between the storage section 26 and the throat section 24 serves to create a suitable support for any materials that are accumulated within the interior volume 46. The shoulder 28 will be resistive of certain movement of such materials from the storage section 26 back toward the opening 18 adjacent the rake member 12. As such, the shoulder 28 provides a surprising amount of support for the material that has been accumulated on the interior of the cleaning device 10. Additionally, the shoulder 28 serves as a stop for the movement of the gate on the interior of the storage section 26.

It should be noted that the handle 40 can be positioned in various locations. If a lesser amount of storage volume 26 is required, then the handle can be extended outwardly beyond the end 48 of the body 14 through the use of extension devices. It is important that the configuration of the handles 40 and 42 be comfortable to the needs of the user. If the size of the storage section 26 is reduced, then it still may be necessary to extend the handle 40 outwardly beyond the end of the body 14. Arms, poles, slide mechanisms, or other devices can be used with the cleaning device 10 so as to provide for the proper alignment of the handles 40 and 42 with respect to the body 14.

Figure 2:
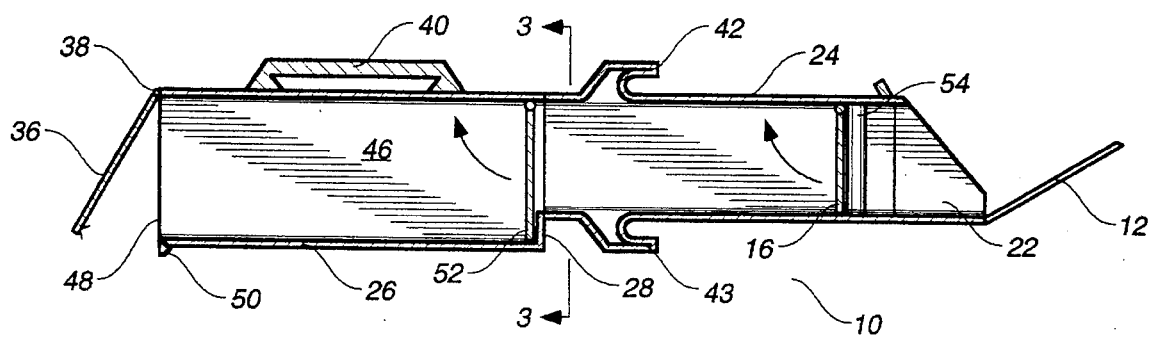
FIG. 2 is a cross-sectional side view of the cleaning device in accordance with the present invention.

FIG. 2 shows a cross-sectional view of the cleaning device 10 of the present invention. In particular, in FIG. 2, the arrangement of the gate members 16 and 52 is shown. Initially, it can be seen that the gate member 16 is positioned generally adjacent to the rake member 12 at the opening 18 of the body 14. The gate member 16 is pivotally connected to the interior of the body 14. A stop 54 is formed on the inner surface of the sides 32 and 35 of the body 14 so as to limit the pivotal movement of the gate member 16. The stop 54 corresponds to the indentations 37 and 37a (shown in FIG. 1). The stop 54 will prevent the gate member 16 from moving in a direction toward the rake member 12. It can be seen that the gate member 16 is only allowed to move in the direction of the arrow shown in FIG. 2.

The gate member 16 is a generally flat flap that is connected to the top surface 30 of the body 14. The gate member 16 can be a plastic flap that is connected by a plastic strip to the body 14 or it can be another type of material that is connected by hinges within the body 14. A strip of polycarbonate material can serve the function of the hinge of the gate member 16. Such polycarbonate material has a memory which would urge the gate member 16 to its original position shown in FIG. 2. In its original position, the gate member 16 will extend transverse to the longitudinal axis of the body 14 and extend downwardly from the top surface 30 so as to be in close juxtaposition with the bottom surface of the interior of the body 14. Similarly, the gate member 16 will have sides that are in close juxtaposition with the sides of the body 14. The gate member 16 is positioned in proximity to the rake member 12 at the opening 18 in the throat section 24 of body 14.

The second gate member 52 is positioned within the storage section 26 generally adjacent to the throat section 24. The second gate member 52 uses the shoulder 28 as a stop member so as to restrict the pivotal movement of the second gate member 52. The second gate member 52 is only pivotable in a direction away from the rake member 12 (as shown by the arrow in FIG. 2). The shoulder 28 is formed at the connection of the throat section 24 to the storage section 26. The second gate member 52 has a size which generally matches the cross-sectional area of the interior volume of the storage section 26 of the body 14. The second gate member 52 is positioned generally adjacent to the throat section 24 so as to prevent movement of materials from the storage section 26 back into the throat section 24.

With reference to FIG. 2, it can be seen how the operation of the present invention occurs. Initially, when material is accumulated on the rake member 12, the cleaning device 10 can be pivoted upwardly by pushing downwardly on the handle 40 and by lifting the opening 18. The material on the rake member 12 will move into the opening 18 and through the first gate member 16. The first gate member 16 will swing backwardly, away from the rake member 12, so as to allow the material to flow therethrough. The material will flow through the throat section 24 and through the second gate member 52. The second gate member 52 will rotate away from the rake member 12 so as to allow the material to pass therethrough. Both of the gate members 16 and 52 should offer minimal resistance to the movement of the material therethrough. After the material is passed through the second gate member 52, it will accumulate within the storage section 26. After a sufficient amount of material has been accumulated within the storage section 26, such materials can be removed by opening the door 36 at the end 48 of the body 14.

The gate members 16 and 52 provide the present invention with some notable advantages. First, and foremost, the use of the stops 54 and 28 will prevent the gate members 16 and 52, respectively, from opening so as to allow material on the interior volume 46 of the body 14 from passing back through toward and onto the rake member 12. It is only through the use of these gate members 16 and 52 that material can be accumulated within the interior volume 46. Material can also accumulate within the throat section After experiments with the cleaning device 10 of the present invention, it was found that the use of only the first gate member 16 was generally insufficient for the purposes of the cleaning device 10. As material would accumulate within a single gated cleaning device 10, such material would continually slide back and forth within the interior volume 46 between the storage section 26 and the throat section 24. This created a large shifting of the load such that use became difficult and uncomfortable. The addition of the second gate member 52 allowed material to accumulate within the storage section 26 without continually shifting back and forth. As such, the use of the two gates 16 and 52 provides for a better balancing of the accumulated load within the interior volume 46.

Figure 3:
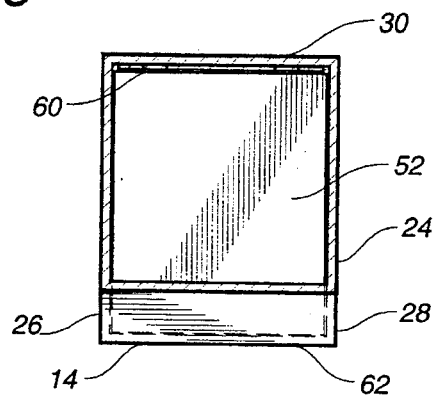
FIG. 3 is a cross-sectional view taken across lines 3—3 of FIG. 2 showing the gate means of the cleaning device of the present invention.

FIG. 3 shows a cross-sectional view of the second gate member 52. The second gate member 52 is attached to the bottom of the top surface 30 through the use of hinge 60. The hinge 60 can be a mechanical hinge or can be a strip of plastic material, such as polycarbonate. The second gate member 52 will extend through the cross-sectional area of the storage section 26 so as to generally block the interior area. The sides of the second gate member 52 are closely juxtaposed against the sides of the storage section 26 of body 14. The bottom edge 62 of the second gate member 52 is closely juxtaposed against the bottom surface of the storage section 26 of body 14. As such, the gate member 52 serves to effectively limit the flow of material therethrough. The shoulder 28 is formed between the storage section 26 and the throat section 24. The stop, defined by the shoulder 28, serves to limit the pivotal movement of the second gate member 52. As such, any material residing on the opposite side of the gate member 52 will be prevented from flowing back therethrough. It is important to note that the stops can be placed on a single side of the body 14 or can be placed on the bottom. FIG. 3 simply shows the preferred arrangement of such stop member.

The foregoing disclosure and description of the invention is illustrative and explanatory thereof. Various changes in the details of the illustrated apparatus construction may be made within the scope of the appended claims without departing from the true spirit of the invention. The present invention should only be limited by the following claims and their legal equivalents.

I claim:

1. A cleaning device comprising:

a rake member;

a body connected to said rake member, said body having an opening adjacent said rake member, said body having an interior volume, said body comprising:

a throat section; and a storage section connected to said throat section, said throat section and said storage section sharing said interior volume, said body having a shoulder formed at a juncture between said throat section and said storage section, said shoulder extending outwardly from said throat section; and gate means affixed within said body, said gate means for allowing material to pass from said rake member into said interior volume while preventing movement of material from said interior volume toward said rake member.

2. The device of claim 1, said body having a door means affixed to an end of said body opposite said rake member, said door means for accessing said interior volume.

3. The device of claim 2, said door means being a panel hingedly connected to said body, said panel movable between a first position closing said interior volume and a second position opening said interior volume.

4. The device of claim 1, further comprising:

a first handle affixed to a top surface of said body; and a second handle affixed to said surface of said body between said first handle and said rake member.

5. The device of claim 4, one of said first and second handles being aligned with a longitudinal axis of said body, the other of said first and second handles being transverse said longitudinal axis of said body.

6. The device of claim 1, said body having a funnel means at an end of said body adjacent said rake member, said funnel means for guiding material from said rake member into said opening.

7. The device of claim 1, said gate means positioned within said throat section.

8. The device of claim 1, said gate means comprising:

a gate member hingedly connected within said body, said gate member having a size slightly less than a cross-sectional area of said interior volume; and a stop formed within said body adjacent said gate member, said stop for limiting a movement of said gate member.

9. The device of claim 8, said gate member pivotally connected to said body, said gate means pivotable in and only in a direction away from said rake member.

10. A cleaning device comprising:

a rake member;

a body connected to said rake member, said body having an opening adjacent said rake member, said body having an interior volume, said body comprising:

a throat section; and a storage section connected to said throat section, said throat section and said storage section sharing said interior volume, and, gate means affixed within said body, said gate means for allowing material to pass from said rake member into said interior volume while preventing movement of material from said interior volume toward said rake member, said gate means positioned within said throat section, said gate means comprising:

a first gate affixed within said throat section of said body adjacent said rake member; and a second gate affixed within said storage section adjacent said throat section.

11. A cleaning device comprising:

a rake member;

a body connected to said rake member, said body having an opening adjacent said rake member, said body having an interior volume;

a first gate member pivotably connected within said body adjacent said rake member, said first gate member pivotable away from said rake member; and a second gate member pivotably connected within said body rearwardly of said first gate member, said second gate member pivotable away from said rake member;

said body comprising:

a throat section; and a storage section connected to said throat section, said throat section and said storage section sharing said interior volume, said first gate member positioned within said throat section, said second gate member positioned within said storage section adjacent said throat section.

12. The device of claim 11, further comprising:

a first stop means formed within said body between said first gate member and said rake member, said first stop means for restricting a direction of movement of said first gate member.

13. The device of claim 12, further comprising:

a second stop means formed within said body between said first gate member and said second gate member, said second stop means for restricting a direction of movement of said second gate member.

14. The device of claim 11, said body having a shoulder formed at a juncture between said throat section and said storage section, said shoulder extending outwardly from said throat section toward said storage section, said shoulder defining a stop to restrict movement of said second gate member.

15. The device of claim 11, further comprising:

a handle means affixed to a top surface of said body and extending upwardly therefrom, said handle means for receiving human hands therein so as to manipulate said body.

16. A cleaning device comprising:

a rake member;

a body connected to said rake member, said body having an opening adjacent said rake member, said body having an interior volume;

a first gate member pivotably connected within said body adjacent said rake member, said first gate member pivotable away from said rake member;

a second gate member pivotably connected within said body rearwardly of said first gate member, said second gate member pivotable away from said rake member; and a handle means affixed to a top surface of said body and extending upwardly therefrom, said handle means for receiving human hands therein so as to manipulate said body, said handle means comprising:

a first handle affixed to said body; and a second handle affixed to said body between said first handle and said rake member, one of said first and second handles being aligned with a longitudinal axis of said body, the other of said first and second handles being transverse to said longitudinal axis of said body.

* * * * *